US011954091B2

(12) United States Patent
Ma et al.

(10) Patent No.: US 11,954,091 B2
(45) Date of Patent: Apr. 9, 2024

(54) METHOD AND APPARATUS FOR CONSISTENT PAGE SPLIT OPERATION IN A MULTI-MASTER DATABASE

(71) Applicant: HUAWEI TECHNOLOGIES CO., LTD., Shenzhen (CN)

(72) Inventors: Wenbin Ma, Sammamish, WA (US); Huaxin Zhang, Markham (CA); Yuk Kuen Chan, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 17/587,564

(22) Filed: Jan. 28, 2022

(65) Prior Publication Data

US 2022/0156248 A1 May 19, 2022

Related U.S. Application Data

(63) Continuation of application No. PCT/CN2020/084766, filed on Apr. 14, 2020.

(51) Int. Cl.
*G06F 16/23* (2019.01)
*G06F 11/07* (2006.01)
*G06F 16/22* (2019.01)
*G06F 16/27* (2019.01)

(52) U.S. Cl.
CPC ...... *G06F 16/2365* (2019.01); *G06F 11/0709* (2013.01); *G06F 16/2246* (2019.01); *G06F 16/278* (2019.01)

(58) Field of Classification Search
CPC ............ G06F 16/2365; G06F 16/2246; G06F 16/278; G06F 11/0709
See application file for complete search history.

(56) References Cited

U.S. PATENT DOCUMENTS

| | | | | |
|---|---|---|---|---|
| 7,809,759 | B1* | 10/2010 | Bruso | G06F 16/2246 707/803 |
| 9,003,162 | B2* | 4/2015 | Lomet | G06F 16/2246 707/999.2 |
| 9,378,305 | B1* | 6/2016 | Erdmann | G06F 16/9027 |
| 2003/0204513 | A1* | 10/2003 | Bumbulis | G06F 16/2246 |
| 2007/0005631 | A1 | 1/2007 | Barsness et al. | |
| 2008/0228795 | A1* | 9/2008 | Lomet | G06F 16/22 |

(Continued)

OTHER PUBLICATIONS

Ibrahim Jaluta et al., Concurrency control and recovery for balanced B-link trees. The VLDB Journal, vol. 14, pp. 257-277(2005), 21 pages.

(Continued)

*Primary Examiner* — Huawen A Peng

(57) ABSTRACT

Methods and apparatus are described for splitting a page (or node) in an index tree database index for a multi-master database. The methods include creating a first split page of a first page. The first page belongs to a first set of pages and comprises a hinge page. The hinge page also belongs to a second set of pages. Updating the first set of pages may cause the hinge page itself to split, creating a split of the hinge page. The second set of pages is updated in response to creating the split of the hinge page. Described are techniques whereby the updates to the first and second sets of pages are atomic, that is, they all succeed or they all fail, which may realize any of several benefits.

8 Claims, 13 Drawing Sheets

(56) References Cited

U.S. PATENT DOCUMENTS

| | | | |
|---|---|---|---|
| 2009/0182709 A1* | 7/2009 | Ritchie | G06F 16/2246 |
| | | | 707/E17.05 |
| 2011/0106811 A1* | 5/2011 | Novoselsky | G06F 16/81 |
| | | | 707/E17.123 |
| 2011/0153580 A1* | 6/2011 | Bright | G06F 16/2246 |
| | | | 707/696 |
| 2013/0346725 A1* | 12/2013 | Lomet | G06F 12/0804 |
| | | | 711/206 |
| 2014/0214767 A1* | 7/2014 | Graefe | G06F 16/27 |
| | | | 707/645 |
| 2016/0283538 A1 | 9/2016 | Barber et al. | |
| 2018/0032560 A1 | 2/2018 | Fang et al. | |
| 2019/0163579 A1* | 5/2019 | Pothoff | G06F 16/2365 |

OTHER PUBLICATIONS

Ibrahim Jaluta et al., B-Tree Concurrency Control and Recovery in Page-Server Database Systems. ACM Transactions on Database Systems, vol. 31, No. 1, Mar. 2006, pp. 82-132.

Li Yawei, Research and Implementation on MySQL Storage Security. Huazhong University of Science and Technology, 2012, 1 page.

\* cited by examiner

| page no | master_id | latest LSN |
|---|---|---|
| A | 1 | 100→200 |
| A' | 1 | 200 |
| B | 1 | 100→200 |
| C | 1 | 100→200→300 |
| D | 2<br>1 | ~~100→150~~<br>150→300 (self healing) |
| E | 1 | 100→300 |

Master 1 (108)

| page no | master_id | latest LSN |
|---|---|---|
| A | 2<br>1 | 100→150<br>100→200 conflict |
| A' | (exc1) | 100→200 |
| B | (exc1) | 100→200 |
| C | (exc1) | 100→200 |
| D | (exc1) | 100→150 |

1200

| page no | master_id | latest LSN |
|---|---|---|
| A | 1(0) | 100 |
| B | 2(0) | 200 |
| C | 3(0) | 300 |
| D | 1(0) | 400 |
| E | 2(0) | 500 |
| F | 3(0) | 600 |

1202

| page no | master_id | latest LSN |
|---|---|---|
| A | 1(0) | 700 |
| B | 2(0) | 200 |
| C | 3(0) | 300 |
| D | 1(0) | 400 |
| E | 2(0) | 500 |
| F | 3(0) | 600 |

1204

| page no | master_id | latest LSN |
|---|---|---|
| A | 1(0) | 700 |
| B | 2(1) exc2 | 200 700 |
| C | 3(0) | 300 |
| D | 1(1) exc2 | 400 700 |
| E | 2(0) | 500 |
| F | 3(0) | 600 |

| page no | master_id | latest LSN |
|---|---|---|
| A | 1(0) | 700 |
| B | 2(1) exc2 | 200 700 |
| C | 3(1) exc2 | 300 700 |
| D | 1(1) exc2 | 400 700 |
| E | 2(0) | 500 |
| F | 3(0) | 600 |

1208

| page no | master_id | latest LSN |
|---|---|---|
| A | 1(0) | 700 |
| B | 2(1) exc2 | 200 700 |
| C | 3(1) exc2 | 300 700 |
| D | 1(1) exc2 | 400 700 |
| E | 2(1) exc2 | 500 700 |
| F | 3(1) exc2 | 600 700 |

1210

| page no | master_id | latest LSN |
|---|---|---|
| A | 1(0) | 700 |
| B | 2(0) ~~exc2~~ | 200 ~~700~~ |
| C | 3(1) exc2 | 300 700 |
| D | 1(1) exc2 | 400 700 |
| E | 2(1) exc2 | 500 700 |
| F | 3(1) exc2 | 600 700 |

Figure 12B

METHOD AND APPARATUS FOR CONSISTENT PAGE SPLIT OPERATION IN A MULTI-MASTER DATABASE

CROSS-REFERENCE TO RELATED APPLICATIONS

This application is a continuation of International Application No. PCT/CN2020/084766 filed Apr. 14, 2020 entitled "METHOD AND APPARATUS FOR CONSISTENT PAGE SPLIT OPERATION IN A MULTI-MASTER DATABASE" the entire contents of which is incorporated herein by reference.

FIELD OF THE INVENTION

The present invention pertains to the field of multi-master database and in particular to a method and apparatus for performing consistent index page split operations in a multi-mater database.

BACKGROUND

A multi-master database is a distributed database in which any master node of the multi-master database may update an index or data of the database. All masters are responsive to client data queries. The multi-master database includes a distributed database management system, which is responsible for resolving any conflicts that might arise between concurrent modifications to the database made by different master nodes.

A goal of any database is to speed up data retrieval operations. Many databases utilize a data structure called an index in order to quickly locate data stored in the database without doing an exhaustive search of the entire database. A database index is composed of index pages that may be organized in a tree structure such as a B-tree. A database index organized in a B-tree includes a root index page at a top of the tree, internal index pages in the middle of the tree, and leaf index pages at a bottom of the tree.

Indexes are stored in pages. An index page need not be static, but may change as data in the database changes. For purposes of discussion, changes (alterations, modifications, additions, deletions, and so forth) to an index page may be referred to as updates (or update operations). During an update operation a row of the index page must be added or updated. In many cases, an index key dictates that a row of an index must be located on a particular row or set of rows in the index table. If the index page becomes full or a required row is not available, then an index page split operation occurs. Since index pages are organized in a B-tree, a split in a leaf index page may cause higher level index pages to undergo page splits also.

In a multi-master database, methods for performing an index page split ideally must be fail-proof in the presence of concurrent writes conflicts and potential system crashes without relying on transactional support. This includes the splitting of a lower level leaf node page, as well as any higher-level leaf nodes that must also split as a result of the lower level split.

An index page split may involve updates to multiple index pages and multiple levels of the index tree. A system crash during the split procedure could leave the index in an inconsistent state. In other situations, concurrent writes from other transactions may conflict with some pages during the index split, and the whole index split procedure should either abort or succeed with compensational operation. Traditional wisdom is to rely on transactional support to ensure that an index split is atomic (indivisible), or to use locking to ensure the whole process is atomic. Both approaches are specific to certain database implementations and cannot be applied universally on any existing database implementations. Further, using transactional support or locking mechanism introduces performance overhead.

Therefore, there is a need for a method and apparatus for performing index splits in a multi-master database that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for implementing index page split operations in multi-master database. In accordance with embodiments of the present invention, there is described a method that includes receiving from a database server a first index tree of a database index for a multi-master database, the first index tree comprising a first plurality of index pages in a tree structure. (In this discussion, the use of 'first' and 'second' indicates that two different things of a similar type may be discussed; the use of these words does not necessarily indicate importance or order of operations.) Following updating a first index page of the first plurality of index pages, a first split index page is created. This first split index page and the first index page belonging to a first set of pages, the first set of pages further comprising a first hinge page. As described below, a 'hinge' page (or 'hinge' index page) links an upper level page that links to lower level pages and can propagate information of the lower level to the upper level. The method further includes updating at least one first link between the first index page and the first hinge page.

In response creation of the first split index page, the method further includes creating a split hinge page. Updates to the index tree comprise (but are not necessarily limited to) updates to the first index page, the first split index page, the first hinge page and the split hinge page. The first hinge page and the split hinge page belong to a second set of pages. The updates to the index tree are sent to the database server.

An abort message from the database server may be received, the abort message signifying that the first set of pages and the second set of pages have been aborted. It is possible that one of the updates to the first set of pages and the second set of pages succeeded, and the updates to the other of the first set of pages and the second set of pages failed; or it is possible that both updates failed. Failure may have many possible causes, such as one or both updates conflicting with another transaction. In either event, the abort message covers both sets of pages, which may include updates for which there is no conflict, and which may in other circumstances have succeeded. The method further includes receiving from the database server a second index tree of the database index for the multi-master database, the second index tree comprising a second plurality of index pages. Other transactions may be able to succeed after reloading the updated pages that caused the conflict.

In another embodiment, the method comprises receiving from a first master node a first update to an index tree of a database index for a multi-master database, the index tree comprising a plurality of index pages in a tree structure. The first update to the index tree comprises updates to a first index page, a first split index page, and a first hinge page. The first index page, the first split index page and the first hinge page belong to a first set of pages.

The method further includes receiving from the first master node a second update to the index tree. The second update to the index tree comprises updates to the first hinge page and a split hinge page. The first hinge page and the split hinge page belonging to a second set of pages.

The method further includes verifying the first update in a page registry table, determining whether there is a first conflict with the first update to at least one of the first set of pages, verifying the second update in the page registry table, and determining whether there is a second conflict with the first update to at least one of the second set of pages. In the event one or more of the first and second conflicts exists, the method involves aborting the first update and the second update. The method may also comprise sending an abort message to the first master node, the abort message signifying that the first set of pages and the second set of pages have been aborted.

Another embodiment pertains to database server apparatus that can carry out at least some of the methods. The database server includes, for example a central processing unit, memory, and a communication interface. The central processing unit, memory, and a communication interface are configured (made capable, e.g., by software, hardware, firmware, or any other manner of configuration) to perform the methods that are described.

In these embodiments, a set of pages and updates are treated as atomic, that is, all succeed or all fail. It is possible that updates for which there is no conflict may nevertheless abort. A master that finds its updates aborted may reload the index pages (one or more of which may be different from what was received or loaded before) and try again. Context indicates some steps are performed in order, while others are not order-dependent. When one event is in response to another, that event may be directly or indirectly in response. Among other notable benefits of the described concepts may include less reliance upon locking to ensure atomicity (in some implementations, fewer pages would be locked) and less reliance upon transactional support. Further, these methods can improve the functionality and protect the integrity of many different database configurations.

BRIEF DESCRIPTION OF THE FIGURES

Further features and advantages of the present invention will become apparent from the following detailed description, taken in combination with the appended drawings, in which:

FIG. 12A and FIG. 12B illustrate a more complex embodiment with three masters.

It will be noted that throughout the appended drawings, like features are identified by like reference numerals.

DETAILED DESCRIPTION

Embodiments of the invention include systems and methods to split index pages and recover an inconsistent index when a page split is interrupted or conflicted. Embodiments comprise an auxiliary data structure to support atomic operation on index splits. The auxiliary data structure is referred to as a 'page registry table' and is a central repository to track conflicts that may occur when an index page split occurs.

Figure 1:
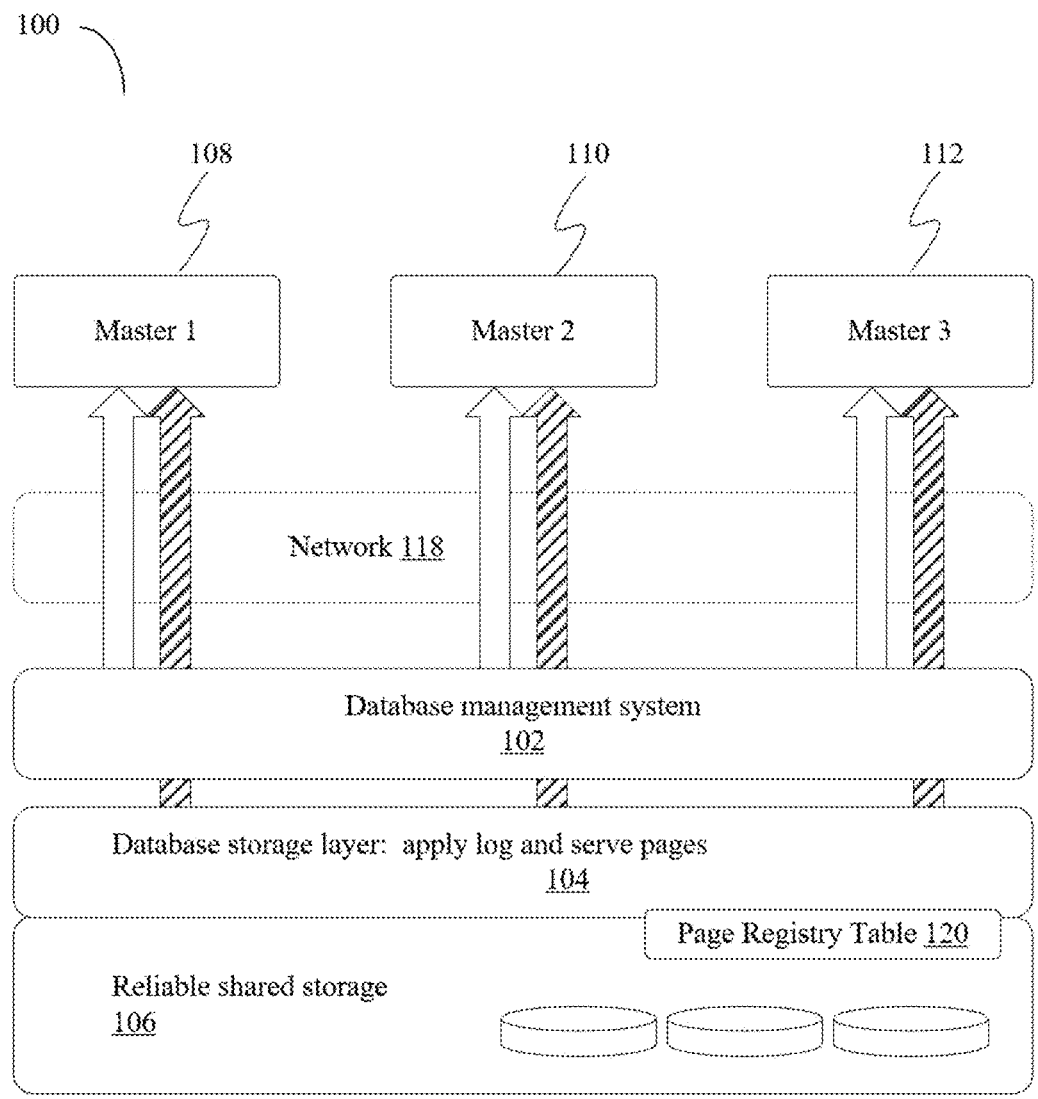
FIG. 1 illustrates a block diagram of a multi-master database as per embodiments of the invention.

FIG. 1 is a block diagram of a multi-master database 100. A database management system 102, which is some embodiments manages modifications to data made by multiple distinct master nodes 108, 110, 112 (or 'masters') and is responsible for propagating data modifications made by each master to the database, and resolve any conflicts that might arise between concurrent modifications made (at or about the same time) by different master nodes. Masters and database management system have access to a database storage layer 104 that applies logs of updates and serves data pages to masters. Data is stored in shared storage 106 which may be provided by a cloud service provide or some other form of distributed or centralized storage. Masters read pages 114 using the database storage layer and conflict resolution 116 is managed by the database management system 102.

The database management system 102 (also called, e.g., a database server) with the database storage layer 104 and the shared storage 106, together with the masters form a database. These components for the database may be implemented using a number of technologies and may be single units or multiple units communicatively coupled through computer interfaces or networks. The database management system 102 maintains a page registry table 120 in storage. The database management system 102 is connected to the multiple masters through a computer or communications network 118 which may include a gateway, router, etc. The network 118 may comprise a plurality of other interconnected routing devices as is known in the art.

Figure 2:
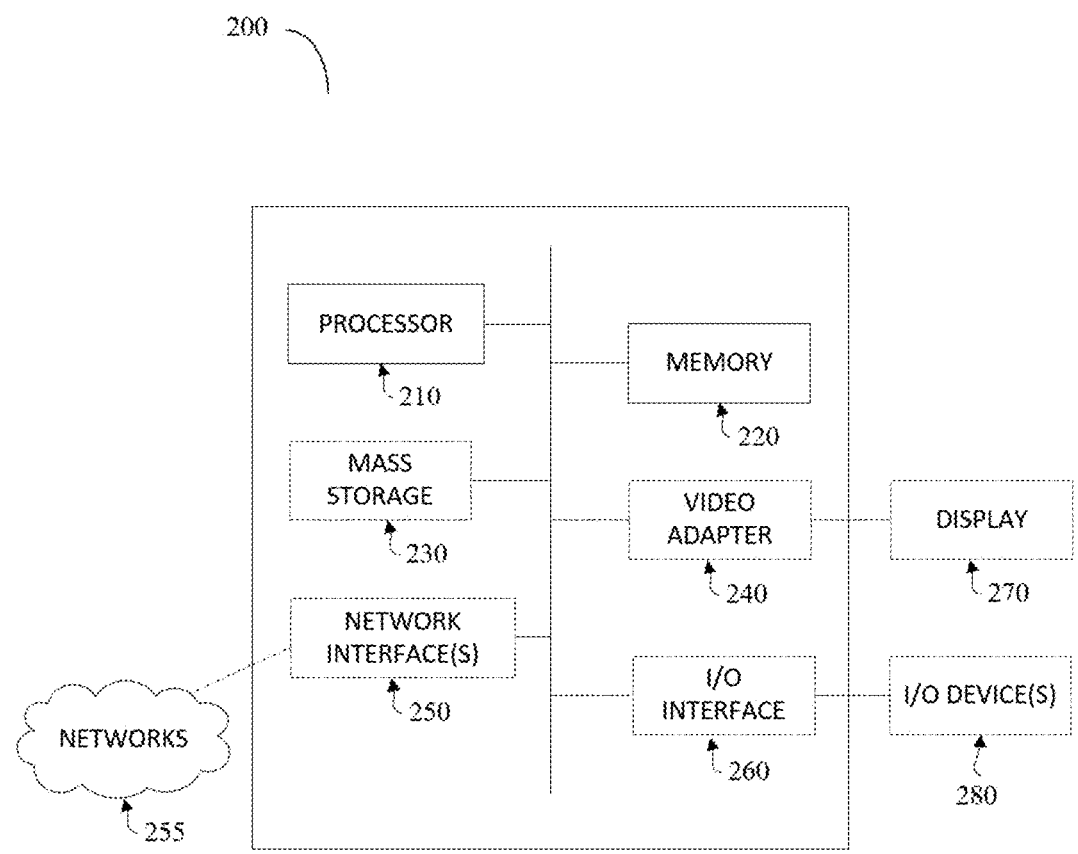
FIG. 2 illustrates a block diagram of a computer system that may be utilized by embodiments of the invention.

When a record is updated or written locally (e.g., at a master), the local copy of the index table is updated as well. A number of updates may be performed and then be committed to the central database stored in database storage layer 104 at server 102. Local updates may require the local index table to be split. Since computing systems 108, 120, 122, and others (not shown) may also update their respective local copies, which may also cause index page splits, committed updates must be periodically reconciled and in some cases, the updates or index page splits may have to be aborted and rolled back to a previous state. FIG. 2 is block diagram of a computing system 200 such as a database server 102 or master 108, 110, 112 that runs a database that performs the method disclosed herein. Specific embodiments may utilize all of the components shown or only a subset of the components, and levels of integration may vary amongst computing systems. Furthermore, a computing system may contain multiple instances of a component, such as multiple processing units, processors, memories, transmitters, receivers, etc. The computing system 200 typically includes a central processing unit (CPU or 'processor') 210, a bus and a memory element 220, and may optionally also include a mass storage device 230, a video adapter 240, and an I/O interface 260 (each shown in dashed lines to indicate they are optional). The computing system may further include one or more communication interfaces, such as network interface(s) 250 for connecting the computing system to other computing systems through one or more communication networks 255. Masters 108, 110, and 112 can communicate with database management system 102 via any communication path and any interface, such as via network 255 and interface 250. Masters 108, 110, and 112 themselves are generally embodied as computer systems, having comparable elements (such as a processor, memory, and communication interface).

The CPU 210 may comprise any type of electronic data processor, and may include one or more cores or processing elements. The memory element 220 may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage device 230, another form of memory element, may comprise any type of non-transitory storage device configured to store data, programs, and other information to implement a database and to make the data, programs, and other information accessible via the bus. The mass storage may comprise, for example, one or more of a solid state drive, hard disk drive, a magnetic disk drive, or an optical disk drive.

The video adapter 240 and the I/O interface 260 provide optional interfaces to couple external input and output devices to the processing unit. Examples of input and output devices include a display 270 coupled to the video adapter 240 and an I/O device 280 such as a touch-screen, keyboard, mouse, etc. coupled to the I/O interface 760. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

Figure 3:
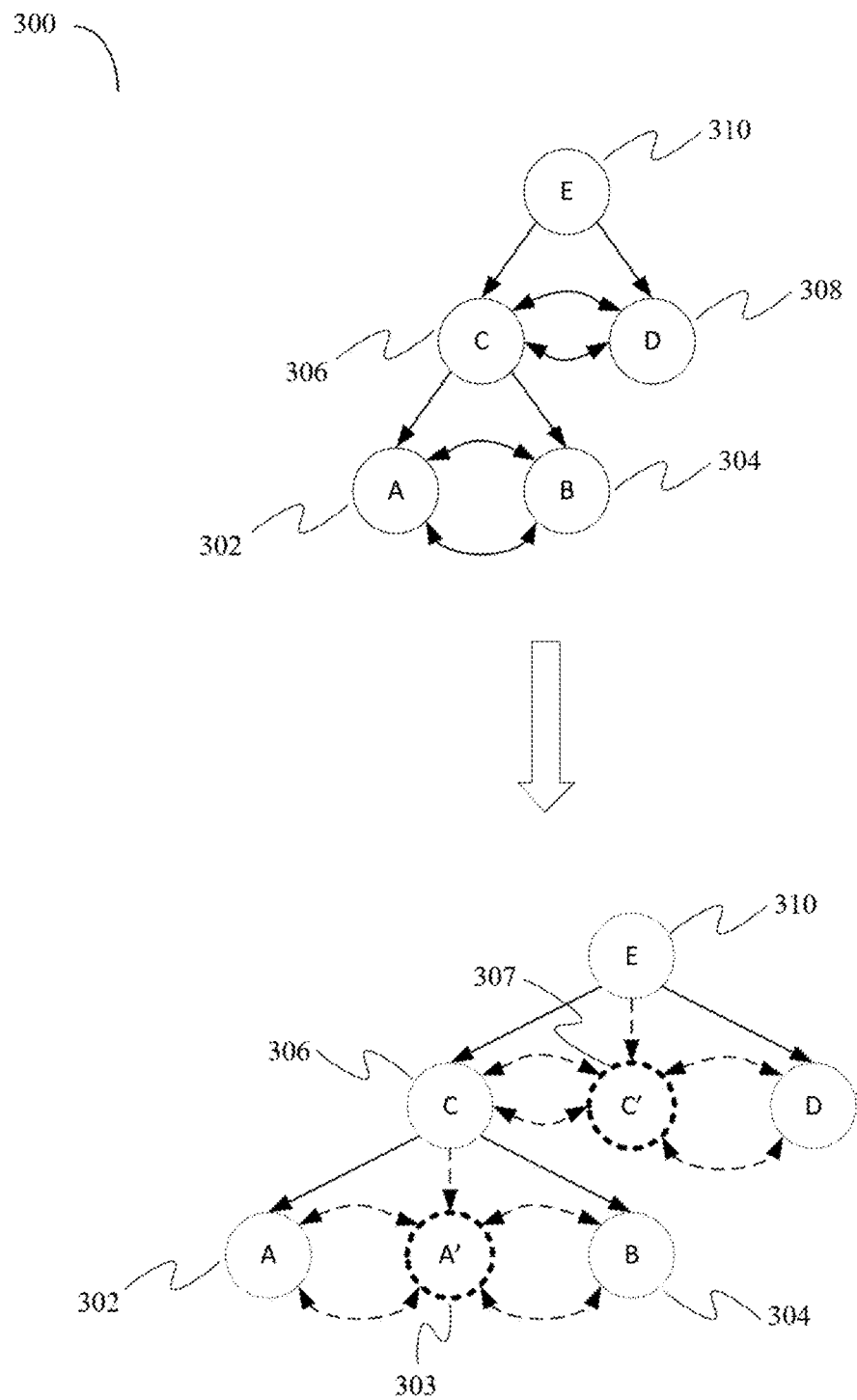
FIG. 3 illustrates an example of splitting of an index page on a lower level and an upper level of a B-tree of index pages.

FIG. 3 illustrates an example embodiment of a B-tree of index pages 300 that is loaded into memory 220 of a master node, such as 108, 110, and 112. The B-tree comprises a lower level with leaf page A 302 and sibling leaf page B 304 and internal pages. Each index page is a node within the B-tree. Pages A and B are linked to each other as well as to parent page C 306 on an upper level (links enable one object or node in a database to access another object or node in the database). Page C 306 is referred to as a 'hinge' node as it links the upper level to the lower level and can propagate information of the lower level to the upper level. Page D 308 is located at the same level as page C 306. Page C 306 and page D 308 are linked to each other as well as to root node E 310.

The discussion of the embodiment of FIG. 3 will focus on the lower level of index page A 302 and index page B 304, and the upper level of index page C 306 and index page D 308. Adding an entry to an index page will possibly cause splitting of the index page. Splitting an index page will not only change the links between the index page and the siblings of the index page but may also cause the splitting of the parent page in a recursive manner to upper levels until the root page is reached. As an example, a split of page A 302 causes new page A' 303 to be created, and links between A 302 and B 304 and A' 303 to be updated. Upper level page C 306 will also be updated with links to split page A' 303. In some cases, the addition of page A' 303 and the resulting updating of links of page C 306 will cause the parent page C 306 to split as well. Splitting page C 306 will cause updates to page C' 307, page C 306, and page D 308, as well as page E 310, which may cause page E 310 to split as well. When splitting an index page occurs, all links between the index page and its siblings must be updated to ensure the atomicity of splits all the way to the index root page, if applicable. Basically, this means that a page and its siblings and parent (and grandparent, or higher level, if applicable) either all get updated as a single operation, or they do not. The atomic operation may be implemented in a variety of ways, including locking only the index pages involved in the atomic operation.

In embodiments where splitting of a page, such as page A 302, on a lower level causes splitting of a page on a higher level, such as page C 306, updates are performed in groups. On a lower level, splitting page A 302 to create page A' 303 involves updating pages A 302, A' 303, B 304, and C 306 atomically. If the update to page C 306 on the upper level causes a split of page C 306 to create page C' 307, then pages C 306, C' 307, D 308, and E 310 must be updated atomically. In some cases, a split on the lower level succeeds but the update or split on the upper hinge page C 306 fails. This can happen due to a system crash or conflicts on pages C 306 and D 308, or for other reasons. In other cases, the lower level split of page A 302 may fail due to conflicts with another transaction, such as an update to page A on another master node, but the failure to split page A 302 only becomes known after the split of page C 306 occurs. This could happen in a multi-writer environment such as multi-master database 100, that page splitting transaction keeps flushing their updates but pages in conflict with other writers are not discovered until commit time. In order to ensure atomicity, embodiments require that all pages updated during an index-split are either committed, or rolled-back.

In some embodiments, the lower level is split first and resulting updates will be resolved with other lower level and hinge pages first while the upper level is being split. Should a conflict occur, it will first occur on the lower level. In these embodiments, updates to the upper level pages only need to succeed if lower level updates succeed. It is sufficient that embodiments ensure that the upper level updates succeed when lower level updates have succeeded, and that the upper level updates abort if the lower level updates have aborted. In embodiments, there are at most three nodes that need to be locked during a recursively upward index split.

Figure 4:
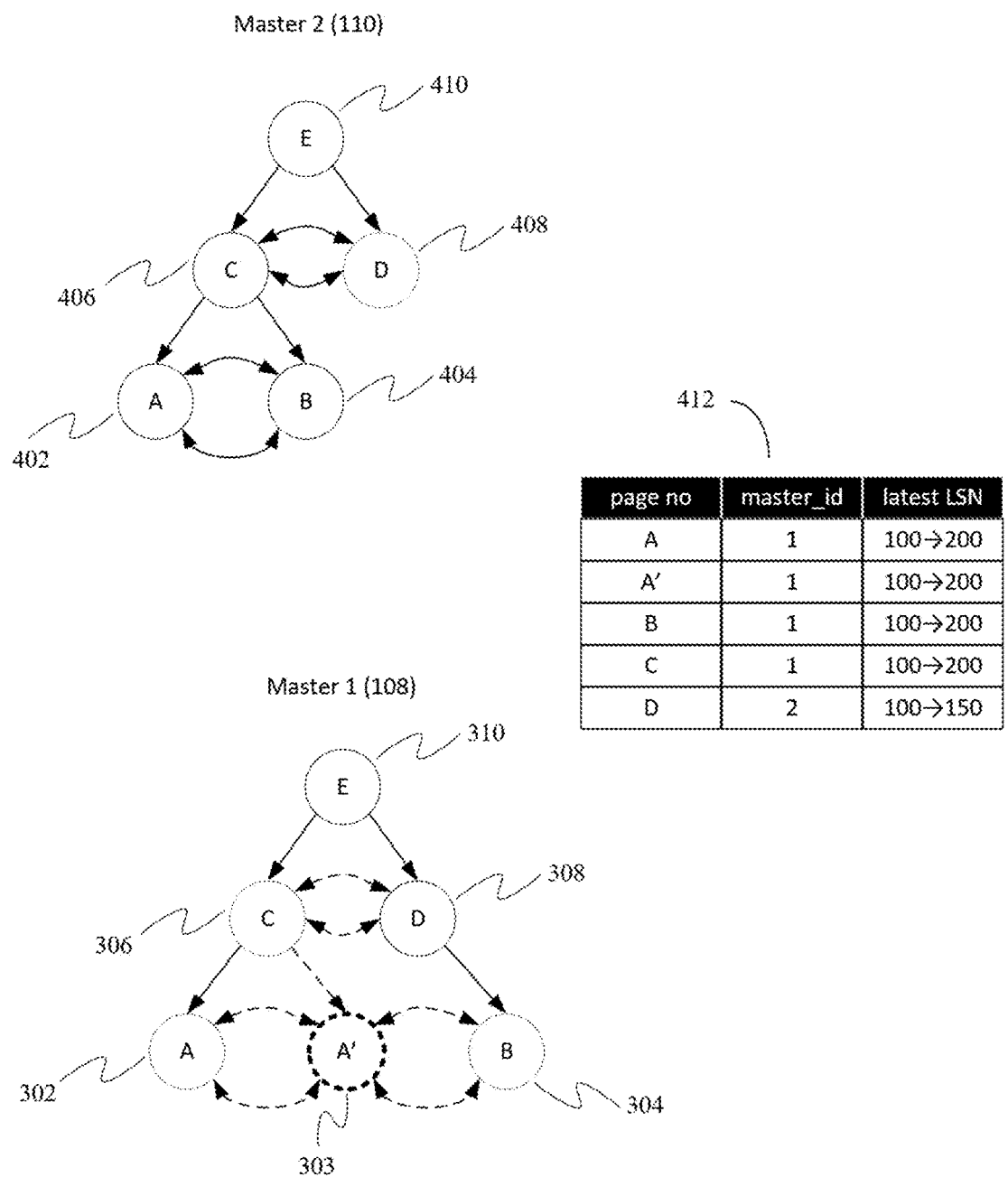
FIG. 4 illustrates an embodiment where a split on the lower level succeeds but the resulting split on the upper level aborts due to a conflict.

FIG. 4 illustrates an embodiment where the lower level split succeeds but the upper level split aborts due to conflicts. One master node such as master 1 108 loads a copy of a B-tree of index pages. A second master node such as master 2 110 also stores its copy of the B-tree (including index pages A 402, B 404, C 406, D 408, and E 410). An illustrative page registry table 412 is stored in memory or storage 106 of server 102. In some embodiments, the page registry table 412 is a hash table. The page registry table 412 includes records that comprise a page number (page no), identifier of the master node (i.e., master_id), and a latest log sequence number (latest LSN). The number of nodes supported by the system is limited by the number of bits allocated to the master_id in the page registry table 412. The searching cost (which may be thought of as the actual or estimated expenditure of resources, not necessarily monetary cost) of the page registry table 412 is linear proportional to the number of conflicting masters. The complexity of the methods described herein grow at most linearly with the number of masters. Each master node will update an index page and using a version number (generally referred to as a LSN number) to track the update to the index page. Index pages are updated by master nodes using transactions; transactions are recorded in a transaction log and are uniquely identified by an LSN. If an LSN has a greater value than another LSN, then the transactions associated with the greater valued LSN occurred after the transactions associated with the other LSN.

In this example, initially the latest LSN is 100. Master 1 108 performs a local update involving index page A 302 which causes a split of A 302 to form page A' 303. The links between page A 302, A' 303, B 304, and page C 306 are also updated. The splitting of page A 302, the creation of page A' 303, and the updates of the links are performed as an atomic operation with LSN 200. In this atomic operation, updates to A' 303, B 304, C 306 may be bundled with updates to A 302 inside a single operation.

Figure 5:
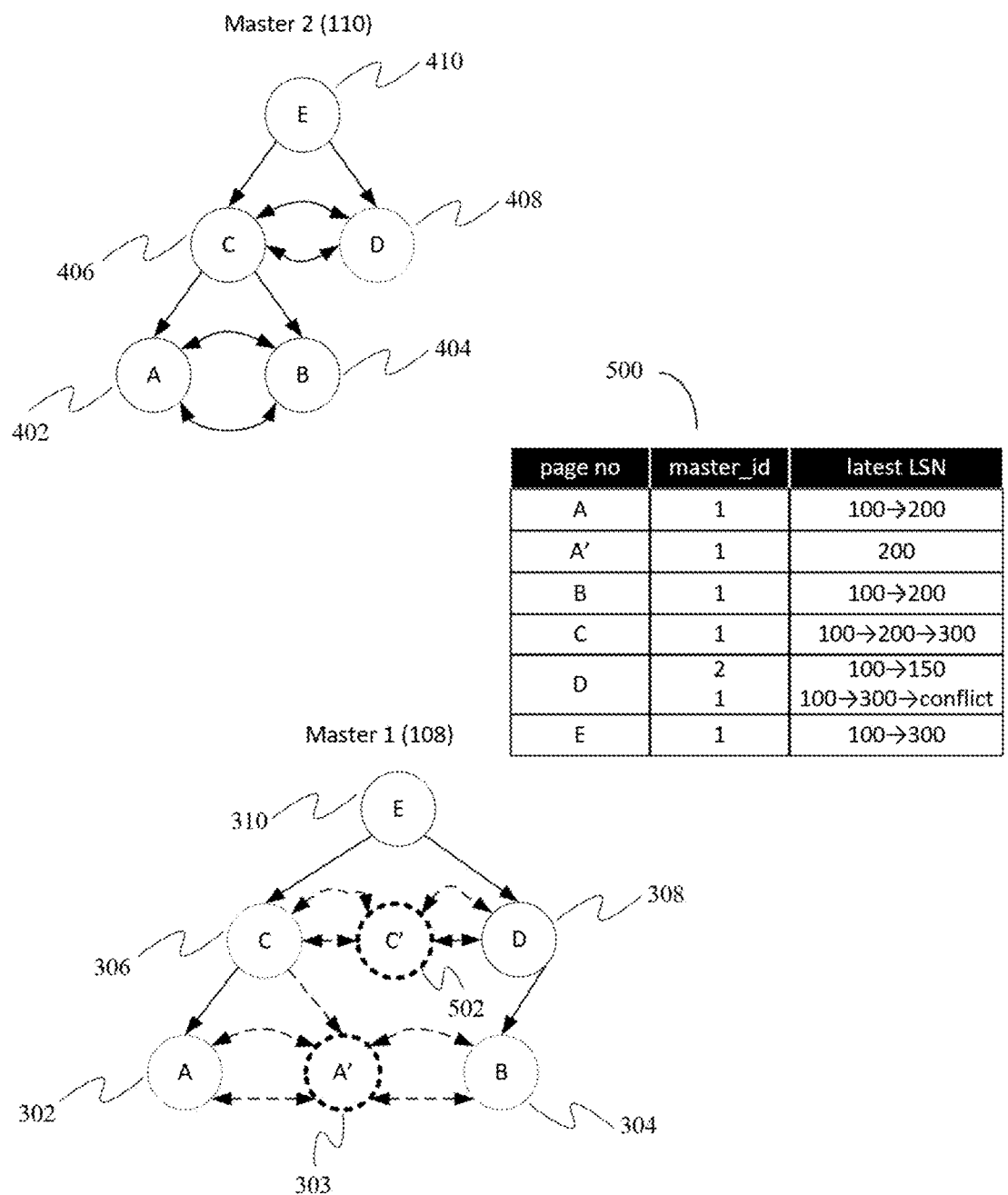
FIG. 5 illustrates an embodiment where a split on the lower level succeeds but the resulting split on the upper level leads to a conflict at an upper level node.

As illustrated in FIG. 5, due to the update of page C 306, page C 306 must be split to form index page C' 502, which requires an update of the links between page C 306, C' 502, page D 308, and page E 310. The splitting of page C 306 and resulting updates are performed my master 1 108 with LSN 300, as shown in illustrative page registry table 500. However, previously to this, master 2 110 has updated index page D 408 with LSN 150 which causes a conflict at node D that is discovered during a conflict resolution procedure after master 1 108 and master 2 110 have committed their updates to server 102. In this case, since the lower level split of page A 302 has succeeded, the upper level split of page C 306 must also succeed, that is, the upper level split of page C 306 must not fail.

Figure 6:
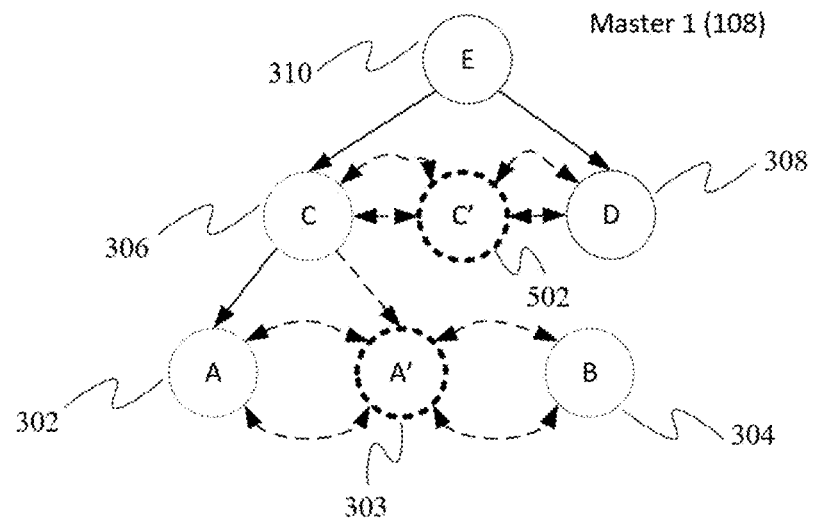
FIG. 6 illustrates an embodiment where a split on the lower level succeeds and the higher-level split is delayed but succeeds eventually.

As illustrated in FIG. 6 (shown with illustrative page registry table 600), some embodiments take advantage of the self-healing properties of the B-tree algorithm which ensures that page D 308 of master 1 108 will be updated during traversal of the tree for the next reader of page D 308, at which point upper level index pages C 306, updated D 308, and E 310 may be updated using an atomic operation.

Figure 7:
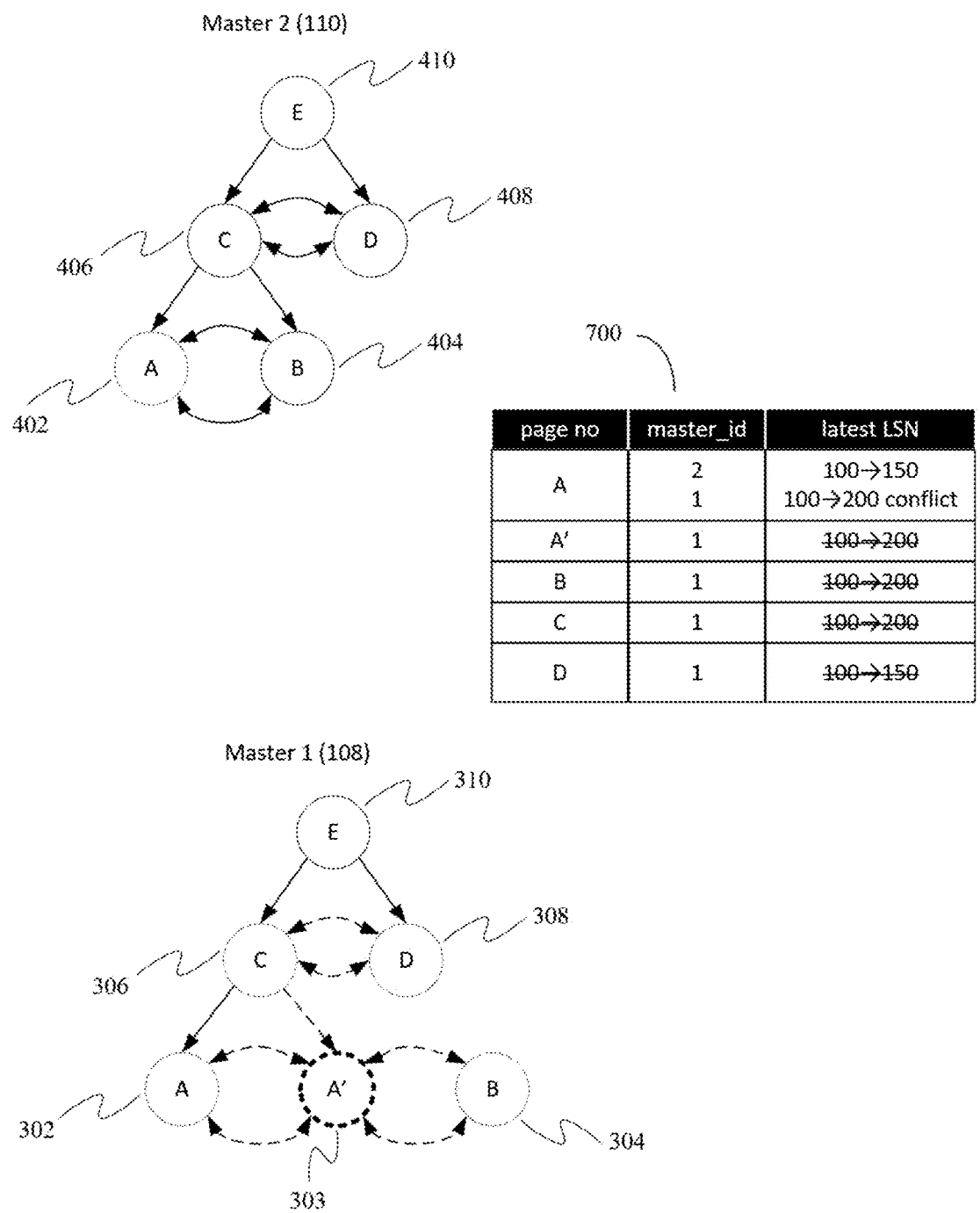
FIG. 7 illustrates an embodiment where a split on the lower level aborts due to a conflict on the lower level.

FIG. 7 (shown with illustrative page registry table 700) illustrates an embodiment where the index page split of page A 302 on the lower level aborts and therefore, a resulting upper level split of page C 306 must also abort. Initially the latest LSN is 100. Unknown to master 1 108, master 2 110 has updated its copy of index page A 402 with LSN 150. Master 1 108 updates index page A 302 which triggers a split of A 302, creates index page A' 303, and causes updates of links between index pages A 302, A' 303, B 304, and C 306 as an atomic operation using LSN 200. In this embodiment the update of index page C 306 requires a split of C. When the updates from master 1 108 and master 2 110 are committed at the server 102, the conflict on page A 302 is discovered and the lower level split of index page A 302 and other updates of the atomic operation are aborted and rolled back. Since the lower level split has been aborted the upper level split of C 306 is also aborted. In some embodiments, the abort operation is also an atomic operation.

Embodiments of the invention utilize atomic operations to implement index split operations. A lower level atomic operation includes the split of index page A 302 to create page A' 303, and updates of pages A 302, A' 303, B 304, and C 306. An upper level atomic operation includes the split of hinge page C 306 to create page C' 502, and updates of pages C 306, C' 502, D 308, and E 310. This may proceed up the B-tree 104 to the root node page. Any two adjacent level in the B-tree will share a 'hinge' page that may be used to propagate abort operations to upper levels.

Some embodiments comprise methods that have the following characteristics:

The method locks the pages at one level of the B-tree at a time.

Conflict on one page will abort all other pages at that level.

Conflicts between levels will be propagated by the hinge page.

Other, non-conflicted transactions from other master may proceed.

Other transactions on the same master can succeed only after reloading the updated pages that caused the conflict.

Figure 8:
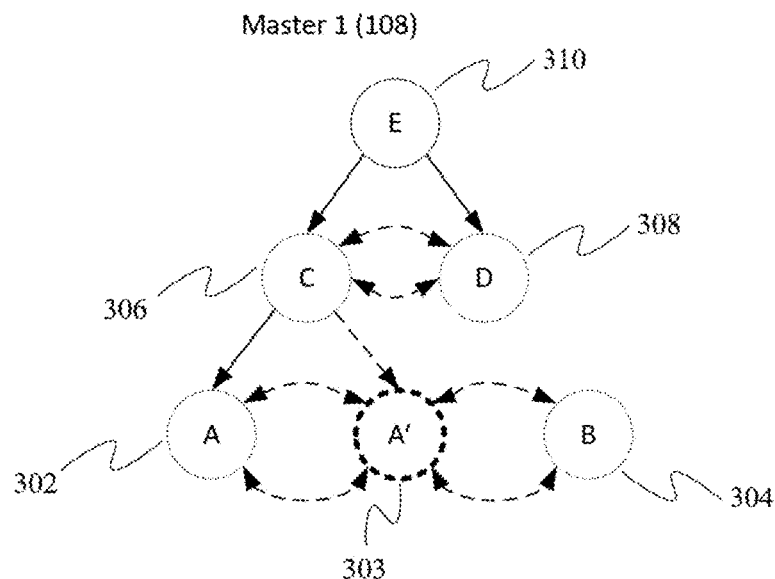
FIG. 8 illustrates an embodiment where a split on the lower level leads to aborting changes to lower level links as well as aborting a split on the upper level.

This embodiment may be illustrated with reference to FIG. 8 that shows the use of marking index pages as 'exceptions' for a particular master in the illustrative page registry table 800 used for conflict resolution at server 102. In some embodiments the page registry table 800 will be managed as two books. One book tracks the conflicted masters and masters with exceptions when their pages are split at the same time as another master and their updates are required to abort. The second book saves the base page info for the remaining masters. Masters in the first book cannot update those pages until the pages are reloaded, and masters in the second book can continue to update on pages, regardless of if they are loaded into local bufferpool or not. This minimizes the bufferpool invalidation while guarantees the data consistency at the same time.

Initially the latest LSN is 100. Master 2 110 updates index page A 302 with LSN 150. Subsequently, master 1 108 updates page A 302, causing a split and resulting creation of index page A' 303 updates of links to A 302, B 304, and C 306 with an atomic operation with LSN 200. Since there is a conflict on index page A 302, the other pages involved with the atomic operation, A' 303, B 304, and C 306 are marked as exceptions with respect to master 1 108 as indicated by the indication, 'exc 1', in the illustrative page registry table 800. These exceptions are recorded in the page registry table 800 as illustrated in FIG. 8. 'Exc 1' indicates that page A' 303, B 304, C 306 cannot be written by any other transactions of master 1 108, if the page's latest LSN is 200. If there are updates based on 200 on master1 108, it should abort. Meanwhile, other nodes will only see page B & C with latest LSN 100, so transactions from other nodes will succeed. Only after the excluded pages are reloaded on master 1 108 (abort the index-split update and restore the latest LSN to 100) that the exclusion will be cleared and other transactions by master1 can attempt to update these pages. In this embodiment the 'latest LSN' of the page registry table 800 indicates the latest 'good' LSN.

Figure 9:
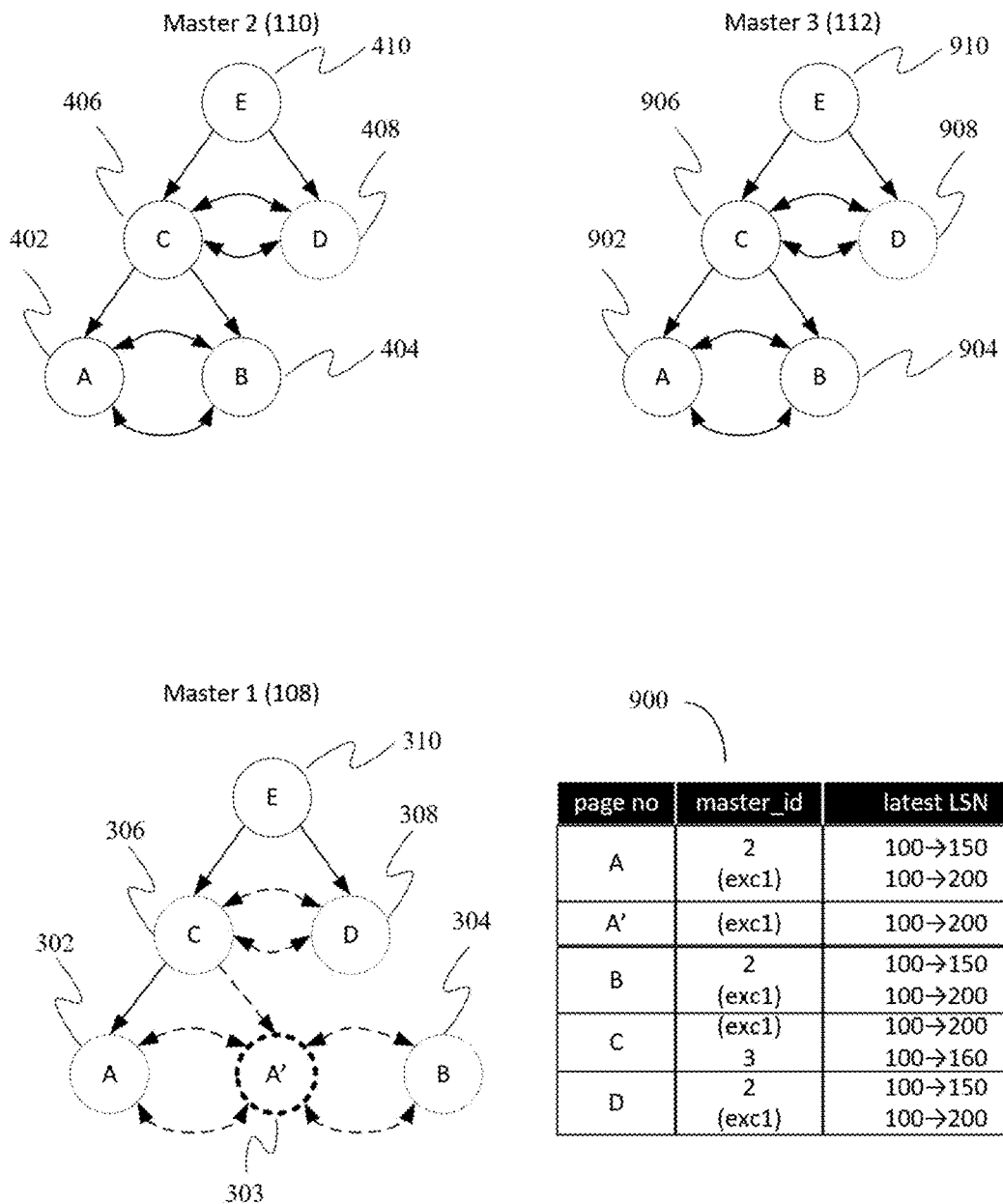
FIG. 9 illustrates an embodiment with three masters.
Figure 10:
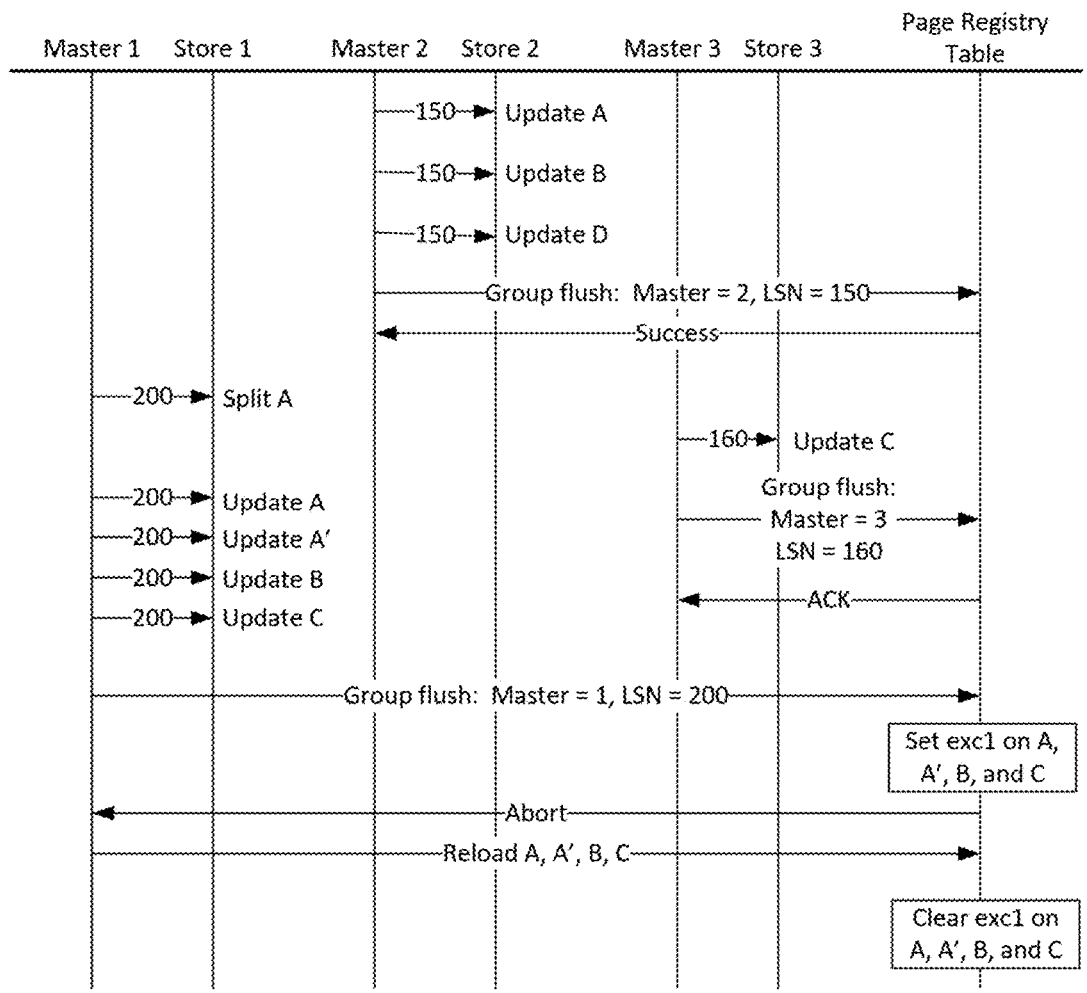
FIG. 10 illustrates a message flow diagram of an embodiment with three masters.

FIGS. 9 and 10 illustrate the use of exclusions in a system with three masters, for example 108, 110, and 112 of FIG. 1. Initially the latest good LSN is 100. Master 2 updates pages A 402, B 404, and D 408 with LSN 150 as indicated in illustrative page registry table 900. The entries for page A, B, and D indicate a master_id of 2 and latest LSN of 150. Subsequently, master 3 updates page C 906 with an LSN of 160 and the entry for page C in the page registry table 900 indicates a master_id of 3 and latest LSN of 160. Master 1 updates page A 302 which causes a split of page A 302. In an atomic operation, page A' 303 is created and links are updated for pages A 302, A' 303, B 304, and C 306 in an atomic operation. The updates by master 2 and master 3 succeed. However, there is a conflict on page A and B that is marked at exc1 in the page registry table 900. Master 1 must reload page A, A', B, C to proceed, and clear its (exc 1) entries. If the split of page A caused by the update by master 1 of page A also causes a split on page C 306, then an exclusion will also be placed on page D 308 and any updates to page D 308 will first require for master 1 to reload page D 308 to clear the exclusion.

Figure 11:
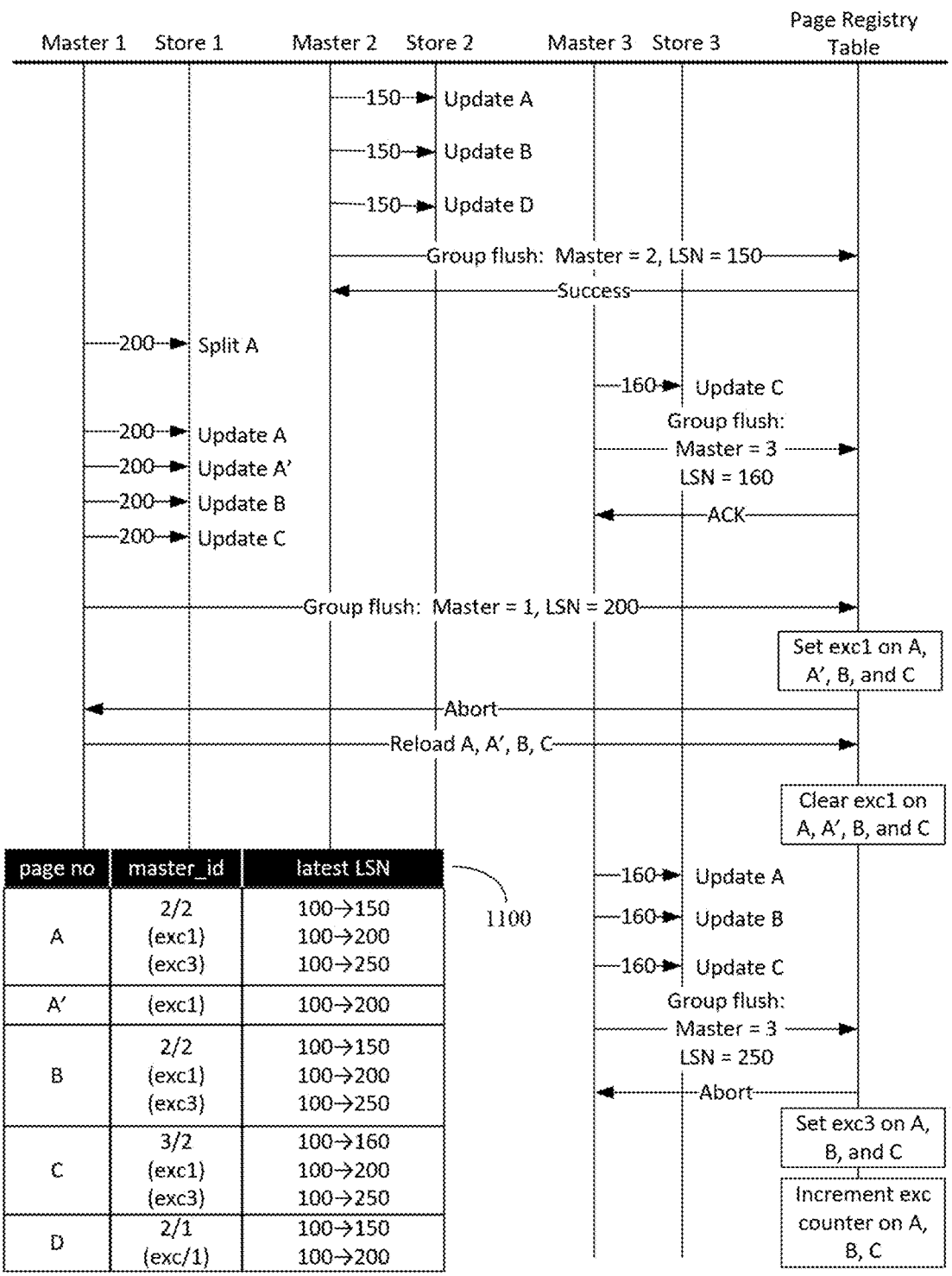
FIG. 11 illustrates a second message flow diagram of an embodiment with three masters.

FIG. 11 illustrates a further embodiment of an enhanced illustrative page registry table 1100 that comprises a counter to record the number of exceptions on a page. Initially the latest good LSN is 100. Master 2 updates pages A, B, and D with LSN 150 as indicated in page registry table 900. The entries for page A, B, and D indicate a master_id of 2 and latest LSN of 150. Subsequently, master 3 updates page C with an LSN of 160 and the entry for page C in the page registry table 900 indicates a master_id of 3 and latest LSN of 160. Master 1 updates page A 302 which causes a split of page A 302. In an atomic operation, page A' 303 is created and links are updated for pages A 302, A' 303, B 304, and C 306 in an atomic operation. The updates by master 2 and master 3 succeed. However, there is a conflict on page A and B that is marked at exc1 in the page registry table 900. The exception counter for each page in the page registry table is also incremented to 1. Master 1 must reload page A, A', B, C to proceed, and clear its (exc 1) entries. If the split of page A caused by the update by master 1 of page A also causes a split on page C 306, then an exclusion will also be placed on page D 308 and any updates to page D 308 will first require for master 1 to reload page D 308 to clear the exclusion. Master 3 then updates pages A, B, and C using LSN 250. Master 3's update has a conflict on pages A, B, and C and must abort. The page register table 1100 is updated with exclusion entries for master 3 on pages A, B, and C and the exclusion counter for these pages are all incremented. The exclusion counter for pages A, B, and C are incremented to 2.

FIGS. 12A and 12B illustrate another embodiment with pages A to F and two masters. Referring to FIG. 12A, initially the illustrative page registry table 1200 indicates that the last good update to page A was LSN 100 by master 1. The last good update to page B was LSN 200 by master 2. The last good update to page C was LSN 300 by master 3. The last good update to page D was LSN 300 by master 1. The last good update to page E was LSN 500 by master 2. The last good update to page F was LSN 600 by master 3. There are no exclusions on any of pages A-F as indicated by exclusion counters set to 0 for all pages in page registry table 1200. Master 1 successfully updates index page A with LSN 700. The page registry table 1202 contains '1(0)' for page A to indicate that the last successful update was from master 1 and that there are no exceptions for page A. In the next step, master 2 updates index pages A, B, and D with an LSN less than 700. This causes a conflict on master 2's update to page A which caused the update to A to abort. The updates to pages B and D are aborted due to the conflict with A and exceptions are put on page B and page D for master 2 in the page registry table 1204. The exception counters for these pages are also incremented to 1 and the latest LSNs are updated to 700.

Referring to FIG. 12B, master 2 now attempts to update index pages A, C, and D with an LSN less than 700 and without having cleared any of its exceptions as indicated in the page registry table 1206. A conflict occurs on A. The exception for master 2 on page D causes the update to page C to abort. An exception with regards to master 2 is placed on page C, the exception counter is incremented to 1, and the latest LSN in set to 700 based on the latest LSN of page A. Subsequently, master 2 attempts updates to index pages C, E, and F. The exception on page C causes prevents the update to page C which caused the updates to pages E and F to abort. Exceptions with respect to master 2 are placed on pages E and F in page registry table 1208, the exception counters for pages E and F are incremented and the latest LSN for pages E and F are set to LSN 700. Master 2 now reloads pages A to F which clears its exceptions on pages A to F in the page registry table 1210 and decrements the exception counters for these pages. Master 2 then initiates a new update to index page B with succeeds without conflict.

In embodiments, an update from a master may encounter a conflict and other updates as part of the same LSN will be flagged with an exception and have to abort. The master that is subject to the exception is then notified as part of the abort command from the central server what pages must be reloaded to clear any exceptions and the latest LSN for the pages for which there are exceptions. For updates to succeed they must use an LSN at or after the latest LSN.

As exceptions apply to specific master, masters not subject to exceptions may continue to access index pages without reloading.

Unless defined otherwise or indicated otherwise by context, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
   receiving from a database server a first index tree of a database index for a multi-master database, the first index tree comprising a first plurality of index pages in a tree structure;
   updating a first index page of the first plurality of index pages;
   following the update of the first index page, creating a first split index page, the first split index page and the first index page belonging to a first set of pages, the first set of pages further comprising a first hinge page;
   updating at least one first link between the first index page and the first hinge page; in response creation of the first split index page, creating a split hinge page, wherein updates to the first index tree comprise updates to the first index page, the first split index page, the first hinge page and the split hinge page, wherein the first hinge page and the split hinge page belong to a second set of pages;
   sending the updates to the first index tree to the database server; and
   receiving an abort message from the database server, the abort message signifying that the first set of pages and the second set of pages have been aborted, wherein one of the updates to the first set of pages and the second set of pages succeeded, and the updates to the other of the first set of pages and the second set of pages failed.

2. The method of claim 1, further comprising:
   receiving from the database server a second index tree of the database index for the multi-master database, the second index tree comprising a second plurality of index pages;
   updating a second index page of the second plurality of index pages; and
   following the update of the second index page, creating a second split index page, the second split index page and the second index page belonging to a third set of pages, the third set of pages further comprising a second hinge page.

3. A method comprising:
   receiving from a first master node a first update to an index tree of a database index for a multi-master database, the index tree comprising a plurality of index pages in a tree structure;
   wherein the first update to the index tree comprises updates to a first index page, a first split index page, and a first hinge page, the first index page and the first split index page and the first hinge page belonging to a first set of pages;
   receiving from the first master node a second update to the index tree;
   wherein the second update to the index tree comprises updates to the first hinge page and a split hinge page, the first hinge page and the split hinge page belonging to a second set of pages;
   verifying the first update in a page registry table;
   determining whether there is a first conflict with the first update to at least one of the first set of pages,
   verifying the second update in the page registry table;
   determining whether there is a second conflict with the first update to at least one of the second set of pages; and
   in the event one or more of the first and second conflicts exists, aborting the first update and the second update.

4. The method of claim 3, further comprising:
   sending an abort message to the first master node, the abort message signifying that the first set of pages and the second set of pages have been aborted.

5. The method of claim 3, wherein one of the updates to the first set of pages and the second set of pages succeeded, and the updates to the other of the first set of pages and the second set of pages failed.

6. A database server comprising:
   a central processing unit;
   at least one memory element storing a page registry table; and
   a communication interface;
   wherein the communication interface is configured to:
   receive from a first master node a first update to an index tree of a database index for a multi-master database, the index tree comprising a plurality of index pages in a tree structure; and
   receive from the first master node a second update to the index tree;
   wherein the first update to the index tree comprises updates to a first index page, a first split index page, and a first hinge page, the first index page and the first split index page and the first hinge page belonging to a first set of pages;
   wherein the second update to the index tree comprises updates to the first hinge page and a split hinge page, the first hinge page and the split hinge page belonging to a second set of pages;
   wherein the central processing unit is configured to:
   verify the first update in the page registry table;
   determine whether there is a first conflict with the first update to at least one of the first set of pages;
   verify the second update in the page registry table;
   determine whether there is a second conflict with the first update to at least one of the second set of pages; and
   abort the first update and the second update in the event one or more of the first and second conflicts exists.

7. The database server of claim 6, wherein the central processing unit is further configured to send an abort message to the first master node via the communication interface, the abort message signifying that the first set of pages and the second set of pages have been aborted.

8. The database server of claim 6, wherein one of the updates to the first set of pages and the second set of pages succeeded, and the updates to the other of the first set of pages and the second set of pages failed.

* * * * *